(12) United States Patent
Deslauriers

(10) Patent No.: US 12,478,779 B2
(45) Date of Patent: Nov. 25, 2025

(54) ELECTRODE ARRAY HAVING A SEMI-LIQUID CONDUCTIVE GEL

(71) Applicant: Novocure GmbH, Root (CH)

(72) Inventor: Richard Deslauriers, Woodbury, CT (US)

(73) Assignee: Novocure GmbH, Baar (CH)

(*) Notice: Subject to any disclaimer, the term of this patent is extended or adjusted under 35 U.S.C. 154(b) by 197 days.

(21) Appl. No.: 18/192,552

(22) Filed: Mar. 29, 2023

(65) Prior Publication Data

US 2023/0310839 A1 Oct. 5, 2023

Related U.S. Application Data

(60) Provisional application No. 63/326,065, filed on Mar. 31, 2022, provisional application No. 63/324,931, filed on Mar. 29, 2022.

(51) Int. Cl.
*A61N 1/04* (2006.01)
*A61N 1/40* (2006.01)

(52) U.S. Cl.
CPC ............ *A61N 1/0496* (2013.01); *A61N 1/40* (2013.01)

(58) Field of Classification Search
None
See application file for complete search history.

(56) References Cited

U.S. PATENT DOCUMENTS

| | | | | |
|---|---|---|---|---|
| 4,750,482 A * | 6/1988 | Sieverding | ............... | C09J 7/10 602/56 |
| 6,038,464 A * | 3/2000 | Axelgaard | ............. | A61B 5/259 600/397 |
| 6,347,246 B1 * | 2/2002 | Perrault | ................... | A61N 1/30 604/20 |
| 7,016,725 B2 | 3/2006 | Palti | | |
| 7,089,054 B2 | 8/2006 | Palti | | |
| 7,333,852 B2 | 2/2008 | Palti | | |
| 7,565,205 B2 | 7/2009 | Palti | | |
| 8,244,345 B2 | 8/2012 | Palti | | |
| 8,715,203 B2 | 5/2014 | Palti | | |
| 8,764,675 B2 | 7/2014 | Palti | | |
| 10,188,851 B2 | 1/2019 | Wenger et al. | | |
| 10,441,776 B2 | 10/2019 | Kirson et al. | | |
| 11,458,298 B2 | 10/2022 | Deslauriers | | |
| 2005/0271725 A1 * | 12/2005 | Kuribayashi | ........ | A61N 1/0444 604/20 |
| 2012/0041296 A1 * | 2/2012 | Garstka | ................ | A61K 31/125 600/395 |

(Continued)

OTHER PUBLICATIONS

Bahram et al., "An Introduction to Hydrogels and Some Recent Applications", *Emerging Concepts in Analysis and Applications of Hydrogels*, InTech Open, 2016.

(Continued)

*Primary Examiner* — Michael W Kahelin
(74) *Attorney, Agent, or Firm* — DUNLAP CODDING, P.C.

(57) ABSTRACT

An assembly, a system, and a method of use for an electrode array having a semi-liquid conductive gel are herein disclosed. The assembly comprises at least one electrode; and a semi-liquid hydrogel having a viscosity of between about 8440 and 20000 milli pascals per second, wherein the semi-liquid hydrogel is disposed between a surface of the at least one electrode and a patient's skin.

20 Claims, 6 Drawing Sheets

(56) References Cited

U.S. PATENT DOCUMENTS

2018/0298240 A1\* 10/2018 Chatterjee ............... A61F 5/443
2020/0372705 A1\* 11/2020 Hershkovich .......... A61N 1/403
2023/0024216 A1    1/2023 Deslauriers

OTHER PUBLICATIONS

Lacouture et al., "Characterization and Management of Dermatologic Adverse Events With the NovoTTF-100A System, a Novel Antimitotic Electric Field Device for the Treatment of Recurrent Glioblastoma", *Seminars in Oncology*, vol. 41, No. 3, Suppl 4, pp. S1-S14, Jun. 2014.

Kirson et al., "Disruption of Cancer Cell Replication by Alternating Electric Fields", May 1, 2004, Cancer Res. 2004 64:3288-3295.

\* cited by examiner

ELECTRODE ARRAY HAVING A SEMI-LIQUID CONDUCTIVE GEL

REFERENCE TO RELATED APPLICATIONS

This application is a non-provisional application claiming benefit to U.S. Provisional Application No. 63/326,065 entitled "ELECTRODE ARRAY HAVING A SEMI-LIQUID CONDUCTIVE GEL" filed on Mar. 31, 2022, and to U.S. Provisional Application No. 63/324,931, entitled "ELECTRODE ARRAY HAVING FOAMED CONDUCTIVE GEL AND METHODS OF PRODUCTION AND USE THEREOF" filed on Mar. 29, 2022. The entire contents of the above-referenced applications are hereby incorporated herein by reference in their entirety.

BACKGROUND ART

Tumor Treating Fields (TTFields) are low intensity (e.g., 1-3 V/cm) alternating electric fields within the intermediate frequency range (50-500 kHz) that target solid tumors by disrupting mitosis. This non-invasive treatment targets solid tumors and is described, for example, in U.S. Pat. Nos. 7,016,725; 7,089,054; 7,333,852; 7,565,205; 8,244,345; 8,715,203; 8,764,675; 10,188,851; and 10,441,776. TTFields are typically delivered through two pairs of electrode arrays that generate perpendicular fields within the treated tumor; the electrode arrays that make up each of these pairs are positioned on opposite sides of the body part that is being treated. More specifically, for the OPTUNE® system, one pair of electrodes is located to the left and right (LR) of the tumor, and the other pair of electrodes is located anterior and posterior (AP) to the tumor. TTFields are approved for the treatment of glioblastoma multiforme (GBM), and may be delivered, for example, via the OPTUNE® system (Novocure Limited, St. Helier, Jersey), which includes electrode arrays placed on the patient's shaved head.

Each electrode array used for the delivery of TTFields in the OPTUNE® device comprises a set of ceramic disk electrodes, which are coupled to the patient's skin (such as, but not limited to, the patient's shaved head for treatment of GBM) through a layer of conductive medical gel. The purpose of the medical gel is to deform to match the body's contours and to provide good electrical contact between the arrays and the skin; as such, the gel interface bridges the skin and reduces interference. The device is intended to be continuously worn by the patient for 2-4 days before removal for hygienic care and re-shaving (if necessary), followed by reapplication with a new set of arrays. As such, the medical gel remains in substantially continuous contact with an area of the patient's skin for a period of 2-4 days at a time, and there is only a brief period of time in which the area of skin is uncovered and exposed to the environment before more medical gel is applied thereto.

Various types of medical gels are known in the art. One particular type of gel useful as part of a TTField-generating system is a conductive hydrogel. Hydrogels are three-dimensional (3-D) networks of hydrophilic polymers that can swell in water and hold a large amount of water while maintaining their structure due to chemical or physical cross-linking of individual polymer chains. Hydrogels are used in many fields, which include the medical sciences if the hydrogels are nontoxic and compatible with biological environments. (Bahram et al. (2016) "An Introduction to Hydrogels and Some Recent Applications." *Emerging Concepts in Analysis and Applications of Hydrogels*. InTech Open).

However, dermatologic adverse events (dAEs) have been observed with the use of existing medical grade hydrogels with TTField generating systems at an incidence rate of 16% and 22% in the phase III trial and the post-marketing surveillance program, respectively; these dAEs include (but are not limited to) allergic and irritant dermatitis, mechanical lesions, ulcers, and skin infections. In particular, irritant contact dermatitis and allergic contact dermatitis can arise from chemical irritation from and allergy to the hydrogel, respectively, while maceration of the skin due to prolonged exposure to the hydrogel can cause lesions/ulcers on the skin, and these lesions/ulcers are subsequently susceptible to infection. These adverse events are exacerbated by the requirement that the hydrogel remain in continuous contact with the patient's skin for multiple days at a time without an extended period of "breathability" between application of TTField arrays to the skin. (Lacouture et al. (2014) *Seminars in Oncology*, 41:S1-S14).

Currently available medical hydrogels typically have pH's that are too acidic for long term wear and thus are damaging to the skin upon extended exposure thereto. In addition, the bottom liner adhesion (i.e., skin adhesion) rate for the currently available hydrogels typically is not high enough to provide the necessary level of attachment to skin for the wear time required. Also, adjustment of either of these two properties can increase the resistivity of the hydrogel, thus affecting the ability of the hydrogel to pass electrical current therethrough. In addition, when a hydrogel comes into contact with sweat over the wear period, the hydrogel swells and degrades, which increases resistivity. Further, loss of the hydrogel interface over the approximately three-day wear period (such as, but not limited to, by erosion of the adhesiveness and conductivity of the hydrogel) reduces the standard current/electric field generated by the TTField system and thus decreases the functionality and overall effectiveness of the TTField treatment.

SUMMARY OF THE INVENTION

Because of this extended exposure and the concomitant unique usage of hydrogels with the TTField system, new and improved conductive gel formulations and assemblies containing the same are desired that possess multiple properties that are unique and vary from the properties typically possessed by currently available medical grade hydrogels. It is to such assemblies, as well as transducer arrays containing the same and methods of producing and using same, that the present disclosure is directed.

In one embodiment, the new and improved assembly comprises at least one electrode; and a semi-liquid hydrogel having a viscosity of between 8440 and 20000 milli pascals per second, wherein the semi-liquid hydrogel is disposed between a surface of the at least one electrode and a patient's skin.

In another embodiment, the method comprises applying two or more transducer arrays to a skin of a patient, each transducer array comprising at least one electrode; a semi-liquid hydrogel having a viscosity of between 8440 and 20000 milli pascals per second, wherein the semi-liquid hydrogel is disposed between a surface of the at least one electrode and a patient's skin; and activating an electric field generator to supply an electrical signal to the two or more transducer arrays thereby generating an electric field for a period of time.

In one embodiment, the system comprises an electric field generator operable to generate an electrical signal having an alternating current waveform at a frequency in a range from 50 kHz to 500 kHz; a first conductive lead electrically coupled to the electric field generator, the first conductive lead configured to carry the electrical signal; a first transducer array having a first electrode element in electrical communication with a first conductive gel element; the first conductive gel element comprising at least a semi-liquid hydrogel, the semi-liquid hydrogel having a viscosity of between 8440 and 20000 milli pascals per second, wherein the semi-liquid hydrogel is disposed between a surface of the first electrode element and a patient's skin; a second conductive lead electrically coupled to the electric field generator, the second conductive lead configured to carry the electrical signal; and a second transducer array having a second electrode element in electrical communication with a second conductive gel element, and the second conductive gel element being configured to be in contact with a patient's skin.

The details of one or more implementations of the subject matter described in this specification are set forth in the accompanying drawings and the description below. Other aspects, features, and advantages of the subject matter will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
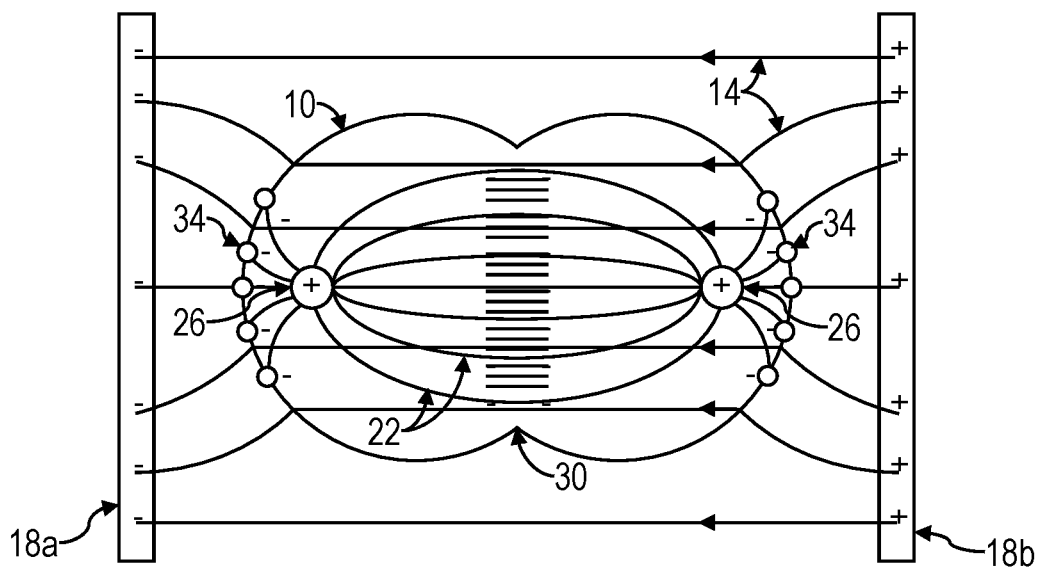
FIG. 1 is an exemplary embodiment of a schematic diagram of electrodes as applied to tissue.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, assemblies, systems, kits, and/or methods disclosed herein can be made and executed without undue experimentation in light of the present disclosure. While the compositions, assemblies, systems, kits, and methods of the inventive concept(s) have been described in terms of particular embodiments, it will be apparent to those of skill in the art that variations may be applied to the compositions and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties to one another as well as indirect association/binding of two moieties to one another. Non-limiting examples of associations/couplings include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example.

The term "patient" as used herein includes human and veterinary subjects. "Mammal" for purposes of treatment refers to any animal classified as a mammal, including (but not limited to) humans, domestic and farm animals, nonhuman primates, and any other animal that has mammary tissue.

The term "treatment" refers to both therapeutic treatment and prophylactic or preventative measures. Those in need of treatment include, but are not limited to, individuals already having a particular condition/disease/infection as well as individuals who are at risk of acquiring a particular condition/disease/infection (e.g., those needing prophylactic/preventative measures). The term "treating" refers to administering an agent/element/method to a patient for therapeutic and/or prophylactic/preventative purposes.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), hardware and software together, and/or the like. The term "processor" as used herein means a single processor or multiple processors working independently or together to collectively perform a task.

As used herein, the term TTField (TTFields) refers to low intensity (e.g., 1-4 V/cm) alternating electric fields of medium frequencies (about 50 kHz-1 MHz, and more preferably from about 50 kHz-500 kHz) that when applied to a conductive medium, such as a human body, via electrodes may be used, for example, to treat tumors as described in U.S. Pat. Nos. 7,016,725, 7,089,054, 7,333,852, 7,565,205, 7,805,201, and 8,244,345 by Palti (each of which is incorporated herein by reference) and in a publication by Kirson (see Eilon D. Kirson, et al., Disruption of Cancer Cell Replication by Alternating Electric Fields, Cancer Res. 2004 64:3288-3295). TTFields have been shown to have the capability to specifically affect cancer cells and serve, among other uses, for treating cancer. TTFields therapy is an approved mono-treatment for recurrent glioblastoma (GBM), and an approved concomitant therapy with chemotherapy for newly diagnosed GBM patients.

As used herein, the term TT Signal is an electrical signal that, when received by electrodes applied to a conductive medium, such as a human body, causes the electrodes to generate the TTField described above. The TT Signal is often an AC electrical signal.

Referring to the Figures, shown therein are non-limiting embodiments of various components and configurations of the assemblies disclosed herein, along with electrode arrays and TTField-generating systems containing same.

Referring now to the drawings and in particular to FIG. 1, shown therein is an exemplary embodiment of a dividing cell 10, under the influence of external TTFields (e.g., alternating electric fields in the frequency range of about 50 kHz to about 1 MHz), generally indicated as lines 14, generated by a first electrode 18a having a negative charge and a second electrode 18b having a positive charge. Further shown are microtubules 22 that are known to have a very strong dipole moment. This strong polarization makes the microtubules 22, as well as other polar macromolecules and especially those that have a specific orientation within the cell 10 or its surroundings, susceptible to electric fields. The microtubules 22 positive charges are located at two centrioles 26 while two sets of negative poles are at a center 30 of the dividing cell 10 and point of attachment 34 of the microtubules 22 to the cell membrane. The locations of the charges form sets of double dipoles and therefore are susceptible to electric fields of differing directions. In one embodiment, the cells go through electroporation, that is, DNA or chromosomes are introduced into the cells using a pulse of electricity to briefly open pores in the cell membranes.

Figure 2:
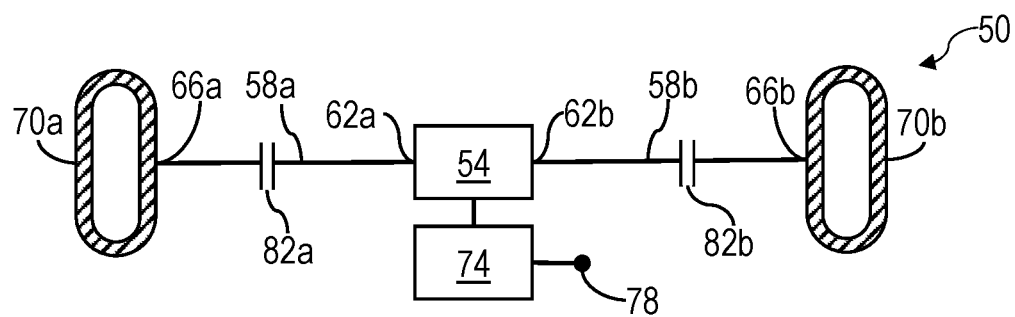
FIG. 2 is an exemplary embodiment of an electronic device configured to generate a TTField constructed in accordance with the present disclosure.

Turning now to FIG. 2, the alternating electric fields (e.g., TTFields) described above that have been found to advantageously destroy tumor cells may be generated by an electronic apparatus 50. FIG. 2 is a simple schematic diagram of the electronic apparatus 50 illustrating major components thereof. The electronic apparatus 50 includes an electric field generator 54 coupled to at least one transducer array 70 and a pair of conductive leads 58, including a first conductive lead 58a and a second conductive lead 58b. The first conductive lead 58a includes a first end 62a and a second end 66a. The second conductive lead 58b includes a first end 62b and a second end 66b. The first end 62a of the first conductive lead 58a is conductively attached to the electric field generator 54 and the first end 62b of the second conductive lead 58b is conductively attached to the electric field generator 54. The electric field generator 54 generates desirable electric signals (TT signals) in the shape of waveforms or trains of pulses as an output. The second end 66a of the first conductive lead 58a is connected to a first transducer array 70a of the at least one transducer array 70 and the second end 66b of the second conductive lead 58b is connected to a second transducer array 70b of the at least one transducer array 70. Both of the first transducer array 70a and the second transducer array 70b are supplied with the electric signals (e.g., TT signals, wave forms). The first transducer array 70a and the second transducer array 70b, being supplied with the electric signals, causes an electrical current to flow between the first transducer array 70a and the second transducer array 70b. The electrical current generates an electric field (i.e., TTField), having a frequency and an amplitude, to be generated between the first transducer array 70a and the second transducer array 70b.

While the electronic apparatus 50 shown in FIG. 2 comprises only two transducer arrays 70 (the first transducer array 70a and the second transducer array 70b), in some embodiments, the electronic apparatus 50 may comprise more than two transducer arrays 70.

The electric field generator 54 generates an alternating voltage wave form at frequencies in the range from about 50 kHz to about 1 MHz (preferably from about 50 kHz to about 500 kHz) (i.e., the alternating electric fields (e.g., TTFields)). The required voltages are such that an electric field intensity in tissue within the treatment area is in the range of about 0.1 V/cm to about 10V/cm. To achieve this field, the potential difference between the two conductors (i.e., electrode layer 148, FIG. 4) in each of the first transducer array 70a or the second transducer array 70b is determined by the relative impedances of the system components, e.g., a fraction of the electric field on each component is given by that component's impedance divided by a total circuit impedance.

In order to optimize the alternating electric field (e.g., TTField) distribution, the first transducer array 70a and the second transducer array 70b (pair of transducer arrays) may be configured differently depending upon the application in which the pair of transducer arrays 70a and 70b are to be used. The pair of transducer arrays, as described herein, are externally applied to a patient, that is, are generally applied to the patient's skin, in order to apply the electric current, and electric field (TTField) thereby generating current within the patient's tissue. Generally, the pair of transducer arrays (e.g., the first transducer array 70a and the second transducer array 70b) are placed on the patient's skin by a user such that the alternating electric field is generated across patient tissue within a treatment area. Alternating electric fields (e.g., TTFields) that are applied externally can be of a local type or widely distributed type, for example, the treatment of skin tumors and treatment of lesions close to the skin surface.

In one embodiment, the user may be a medical professional, such as a doctor, nurse, therapist, or other person acting under the instruction of a doctor, nurse, or therapist. In another embodiment, the user may be the patient, that is, the patient, or a patient helper, may place the first transducer array 70a and the second transducer array 70b on their treatment area.

Optionally, and according to another exemplary embodiment, the electronic apparatus 50 includes a control box 74 and a temperature sensor 78 coupled to the control box 74, which are included to control the amplitude of the alternating electric field so as not to generate excessive heating in the treatment area.

When the control box 74 is included, the control box 74 controls the output of the electric field generator 54 causing the output to remain constant at a value preset by the user. Alternatively, the control box 74 sets the output at the maximal value that does not cause excessive heating of the treatment area. In either of the above cases, the control box 74 may issue a warning, or the like, when a temperature of the treatment area (as sensed by temperature sensor 78) exceeds a preset limit. The temperature sensor 78 may be mechanically connected to and/or otherwise associated with the first transducer array 70a or the second transducer array 70b so as to sense the temperature of the treatment area at either one or both of the first transducer array 70a or the second transducer array 70b.

In one embodiment, the control box 74 may turn off, or decrease power of the TT Signal generated by the electrical field generator 54, if a temperature sensed by the temperature sensor 78 meets or exceeds a comfortability threshold. In one embodiment, the comfortability threshold is the temperature at which a patient would be made uncomfortable while using the first transducer array 70a and the second transducer array 70b. In one embodiment, the comfortability threshold is a temperature at or about 40 degrees Celsius. In one embodiment, the comfortability threshold is a temperature of between about 39 degrees Celsius and 42 degrees Celsius, or a specific selected temperature between about 39 degrees Celsius and 42 degrees Celsius, such as 41 degrees Celsius.

The conductive leads 58 are standard isolated conductors with a flexible metal shield, preferably grounded thereby preventing spread of any alternating electric field generated by the conductive leads 58. The first transducer array 70a and the second transducer array 70b may have specific shapes and positioning so as to generate the TTField of a desired configuration, direction, and intensity at the treatment area and only at that treatment area so as to focus the treatment.

The specifications of the electronic apparatus 50 as a whole and its individual components are largely influenced by the fact that at the frequency of the alternating electric fields (e.g., TTFields), living systems behave according to their "Ohmic", rather than their dielectric properties.

In one embodiment, to protect the patient from any current due to DC voltage or DC offset voltage passing through the patient, leads 58a and 58b may include a DC blocking component disposed thereon, such as a first blocking capacitor 82a and a second blocking capacitor 82b, to block DC current from passing to the first transducer array 70a and the second transducer array 70b, respectively. The first blocking capacitor 82a and the second blocking capacitor 82b pass AC voltage to the first transducer array 70a and the second transducer array 70b, and also prevent any DC voltage or DC offset generated by the electric field generator 54 or otherwise present in the electrical signal from passing to or through the patient. DC voltage, when applied to a patient, may have undesirable consequences, such as electrolysis or excessive heating of the first transducer array 70a and second transducer array 70b without the benefit of contributing to the power of the alternating electric field (e.g., TTField). Thus, the blocking capacitors 82a and 82b can prevent electrolysis due to DC offsets or DC voltage. In one embodiment, the blocking capacitors 82a and 82b are non-polarized capacitors. In one embodiment, the blocking capacitors 82a and 82b have a capacitance of about 1 µF. In one embodiment, the blocking capacitor is a "Goldmax, 300 Series, Conformally Coated, X7R Dielectric, 25-250 VDC (Commercial Grade)" leaded non-polarized ceramic capacitor by KEMET Electronics Corporation (Fort Lauderdale, FL).

Electrically isolating the patient from the electric field generator 54 may be very important, and so providing the first blocking capacitor 82a and/or the second blocking capacitor 82b outside of the electric field generator 54 enhances the safety of the patient. The first blocking capacitor 82a and the second blocking capacitor 82b may be a component of the first lead 58a and the second lead 58b, or in other embodiments, an additional component at any position between the conductor or electrode element and the electric field generator 54. For example, the first blocking capacitors 82a and the second blocking capacitor 82b may be intermediate the first end 62a (or 62b) of the lead 58a (or 58b) and the electric field generator 54, intermediate the second end 66a (or 66b) of the lead 58a (or 58b) and the first transducer array 70a (or 70b), or an element of the first transducer array 70a (or 70b). The inventor believes that the blocking capacitor 82a and 82b can be provided remote from the first transducer array 70a and the second transducer array 70b and still provide for safety of the patient. In other embodiments, the first blocking capacitor 82a and the second blocking capacitor 82b can be located on a non-patient side of the transducer array 70, e.g., a top 128 shown in FIG. 4.

In other embodiments, the first blocking capacitor 82a and the second blocking capacitor 82b may be components of the electric field generator 54, that is, the first blocking capacitor 82a and the second blocking capacitor 82b may be integrated into the electric field generator 54 such that prior to the electrical signal being passed into the leads 58a and 58b, the electrical signal passes through the first blocking capacitor 82a and the second blocking capacitor 82b, respectively.

Figure 3:
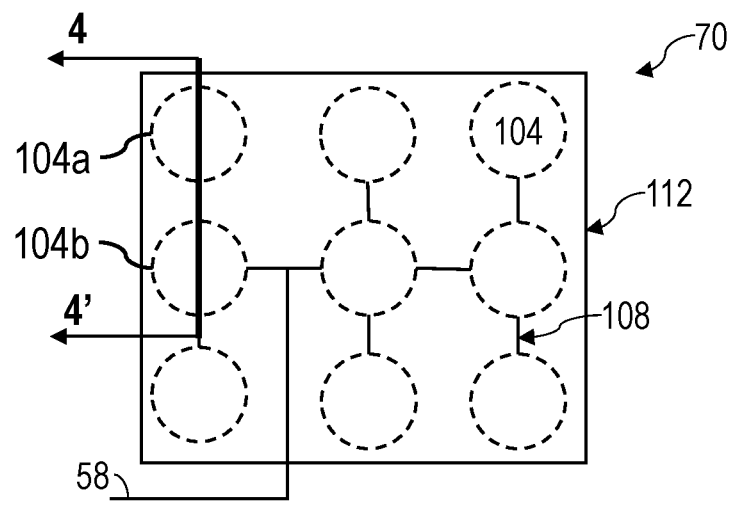
FIG. 3 is a block diagram of an exemplary embodiment of an electrode array constructed in accordance with the present disclosure.

Referring now to FIG. 3, shown therein is a diagram of an exemplary embodiment of the transducer array 70 constructed in accordance with the present disclosure. The transducer array 70 includes one or more electrode element 104. As shown in FIG. 3, the transducer array 70 is configured as a set of electrode elements 104. Transducer arrays 70 may utilize electrode elements 104 that are capacitively coupled. In the example shown in FIG. 3, the transducer array 70 is configured as multiple electrode elements 104 (for example, about 2 cm in diameter) that are interconnected via flex wires 108. Each electrode element 104 may include a ceramic disk and an electrode layer 148 as herein described. In one embodiment, the transducer array 70 includes an outer peripheral edge 112.

Alternative constructions for the transducer array 70 may be used, including, for example ceramic elements that are disc-shaped, ceramic elements that are not disc-shaped, and non-ceramic dielectric materials positioned between the electrode layer and a skin-facing surface of the transducer array 70 over a plurality of flat conductors, e.g., electrode layers 148. Examples of non-ceramic dielectric materials positioned over a plurality of flat conductors include: polymer films disposed over pads (i.e., electrical contacts) on a printed circuit board or over flat pieces of metal. Transducer arrays 70 that utilize electrode elements 104 that are not capacitively coupled may also be used. In this situation, each electrode element 104 of the transducer array 70 would be implemented using a region of a conductive material that is configured for placement against a person's body, with no insulating dielectric layer disposed between the electrode elements 104 and the body. Examples of the conductive material include a conductive film, and a conductive fabric. Other alternative constructions for implementing the transducer arrays 70 may also be used, as long as they are capable of delivering alternating electric fields (e.g., TTFields) to the person's body. Optionally, a gel layer (described here) may be disposed between the transducer array 70 and the person's body in any of the embodiments described herein.

First Aspect

A first aspect of certain non-limiting embodiments includes an assembly comprising at least one electrode element and a semi-liquid hydrogel having a viscosity of between about 8440 and 20000 milli pascals per second, wherein the semi-liquid hydrogel is disposed between a surface of the at least one electrode and a patient's skin.

Figure 4:
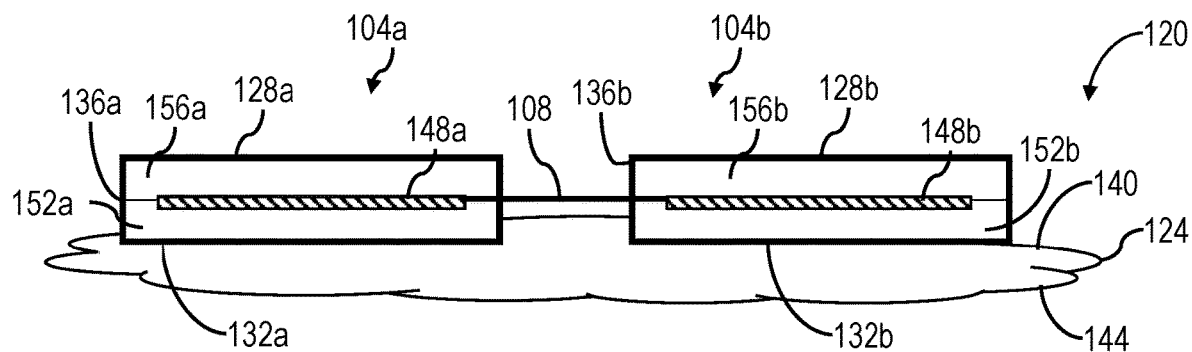
FIG. 4 is a cross-sectional view of an exemplary embodiment of an electrode element constructed in accordance with the present disclosure taken along the lines 4-4' of FIG. 3.

Referring now to FIG. 4, shown therein is a cross-sectional view of an exemplary embodiment of a portion 120 of the transducer array 70 along line 4 of FIG. 3. Shown in FIG. 4 is a cross section of a first electrode element 104a connected to a second electrode element 104b via the flex wire 108, both the first electrode element 104a and the second electrode element 104b are constructed in accordance with the electrode element 104 described above in reference to FIG. 3. Each of the first electrode element 104a and the second electrode element 104b are embedded in a semi-liquid hydrogel 124.

Each electrode element 104 includes a top 128, a bottom 132, and a side 136. For example, as shown in FIG. 4, the first electrode element 104a includes a first top 128a, a first bottom 132a, and a first side 136a while the second electrode element 104b includes a second top 128b, a second bottom 132b, and a second side 136b. The semi-liquid hydrogel 124 generally comprises a first surface 140 and a second surface 144. The second surface 144 may also be referred to as a skin-facing surface or bottom surface. The bottom 132 of the electrode elements 104 is in contact with at least a portion of the first surface 140 of the semi-liquid hydrogel 124, that is, the first bottom 132a and the second bottom 132b are each in contact with at least a portion of the first surface 140.

Each of the electrode elements 104 further comprise at least one electrode layer 148 disposed between a dielectric layer 152 and a non-conducting layer 156. For example, as shown in FIG. 4, the first electrode element 104a comprises a first conducting layer 148a disposed between a first dielectric layer 152a and a first non-conducting layer 156a while the second electrode element 104b comprises a second conducting layer 148b disposed between a second dielectric layer 152b and a second non-conducting layer 156b.

In one embodiment, the at least one electrode layer 148 comprises and/or consists of at least one conducting element and/or compound, including, by way of example only, elemental silver. In one non-limiting embodiment, the dielectric layer 152 comprises a ceramic and/or is coated (for instance) with at least one epoxy and/or at least one temperature sensor, e.g., the temperature sensor 78.

In some embodiments, the semi-liquid hydrogel 124 is provided to establish good electrical conductivity between the electrode element 104 and the patient's skin. In some embodiments, the semi-liquid hydrogel 124 is slightly larger in diameter than the electrode element 104. The material is preferably gamma-sterilization compatible. In one embodiment, the semi-liquid hydrogel 124 has a volume resistivity of 1,000 Ω·cm, or a volume resistivity within a range of 800 Ω·cm to 1,200 Ω·cm.

In some embodiments, the semi-liquid hydrogel 124 is a non-Newtonian fluid that flows under low stress, but breaks under higher stresses and pressures. Thus, the semi-liquid hydrogel 124 may have a fluid-like and solid-like properties together. In some embodiments, the semi-liquid hydrogel 124 may be described as viscoplastic or gelatinous. In some embodiments, the semi-liquid hydrogel 124 has a shore A hardness in a range from 0.5 to 10.

In some embodiments, the semi-liquid hydrogel 124 is a Maxwell fluid. The semi-liquid hydrogel 124 may have a viscosity within a range from 8440 to 20000 milli-pascal seconds, as well as a range between any two values within the above range, at 20 degrees centigrade.

Exemplary embodiments of the semi-liquid hydrogel 124 may be gel formulation number JH8-083121-3 obtainable from Katecho of Des Moines, Iowa having a pH within a range of 6.0 to 8.0 as well as a range between any of the two values within the above range and preferably a pH of 6.8.

In some embodiments, the semi-liquid hydrogel 124 and/or the one or more conductive gel layer are formed primarily of a conductive gel or semi-liquid conductive gel such as described below. The semi-liquid hydrogel 124 may be in any form that allows the electrode elements 104 to function in accordance with the present disclosure.

The semi-liquid hydrogel 124 may have properties including, but not limited to, high conductivity, tackiness, and/or biocompatibility for extended periods of time.

In one embodiment, the semi-liquid hydrogel 124 may be formed of a liquid hydrogel having one or more thickening agent disposed therein. For example, in one embodiment, the semi-liquid hydrogel 124 may be formed from a liquid hydrogel having one or more of a cellulose thickening agent, a xanthan gum, and/or a gellan gum disposed therein, such that, the liquid hydrogel is thickened from a liquid state to a semi-liquid state. In some embodiments, the thickening agent may be, for example, a polymer, such as a polymer having a higher molecular weight, e.g., resulting in a larger molecule size, thereby thickening the liquid hydrogel from a liquid state to a semi-liquid state. In one embodiment, a curing agent to a liquid hydrogel may be selectively applied to the liquid hydrogel to select for a viscosity based at least in part on polymer crosslinking in the polymerization process.

In some embodiments, the semi-liquid hydrogel 124 may be sterile. In some embodiments, the semi-liquid hydrogel 124 may be configured such that the semi-liquid hydrogel 124 does not substantially degrade upon exposure to sterilization conditions that include gamma rays or ethylene oxide gas, for example.

In some embodiments, the semi-liquid hydrogel 124 may be optimized for use at body temperature and/or for use within the comfortability threshold (i.e., in a range of from about 34° C. to about 42° C.) for extended periods of time.

The semi-liquid hydrogel 124 may be provided with any skin adhesion rate that allows the semi-liquid hydrogel 124 to function in accordance with the present disclosure. For example (but not by way of limitation), the skin adhesion rate of the gel may be at least about 200 g/inch, to at least about 600 g/inch, or higher, as well as a range of between any two values within the above range (e.g., a range of from about 220 g/inch to about 600 g/inch, etc.). For example, the skin adhesion rate may be 240 grams/inch.

The semi-liquid hydrogel 124 may be provided with any thickness $t_1$ that allows the semi-liquid hydrogel 124 to function in accordance with the present disclosure. Non-limiting examples of thicknesses $t_1$ that may be utilized in accordance with the present disclosure include about 1 mil to about 100 mil, or higher, as well as a range that combines any value within the above-referenced values (e.g., a range of from about 10 mil to about 50 mil, etc.). For example, the semi-liquid hydrogel 124 may has a thickness of 25 mils or between 20-30 mils.

In some embodiments, the semi-liquid hydrogel 124 may have a shelf life of at least about six months. For example (but not by way of limitation), the semi-liquid hydrogel 124 has a shelf life of at least about 9 months or at least about 12 months.

Figure 5:
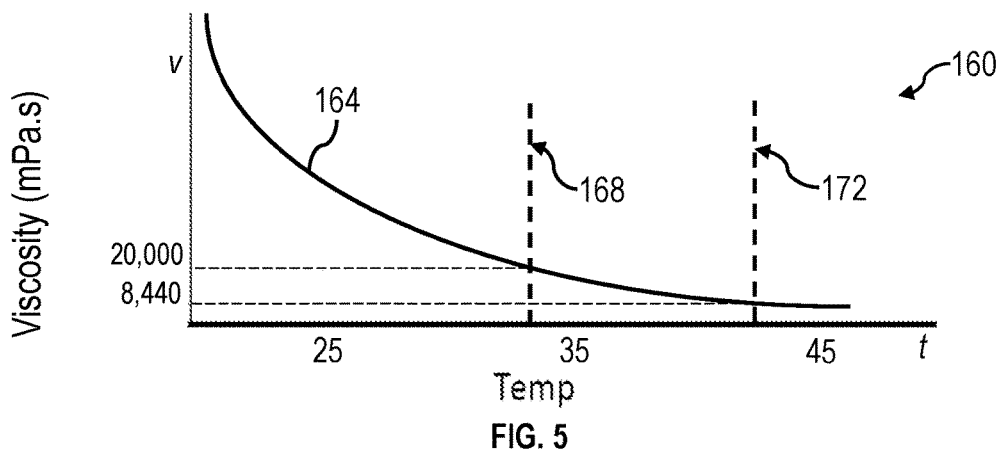
FIG. 5 is a viscosity graph of an exemplary embodiment of a viscosity of the conductive hydrogel constructed in accordance with the present disclosure.

Referring now to FIG. 5, shown therein is a viscosity graph 160 of an exemplary embodiment of a viscosity 164 (in mPa·S) of the semi-liquid hydrogel 124 constructed in accordance with the present disclosure. The viscosity graph 160 graphs the viscosity 164, v, shown on an axis of ordinates, for one or more temperature, t, along an axis of abscissas. As shown in FIG. 5, the viscosity 164 of the semi-liquid hydrogel 124 remains relatively steady in the temperature range at which the electronic apparatus 50 operates, i.e., from a first temperature 168 to a second temperature 172. For example, at temperatures in the range of about 34-42 degrees Celsius (e.g., the first temperature 168 is 34 degrees Celsius and the second temperature 172 is 42 degrees Celsius), the viscosity 164 of the semi-liquid hydrogel 124 is relatively consistent, but does go down as the semi-liquid hydrogel 124 is heated. For example, the viscosity may be between 20,000 milli pascals per second and 8,440 milli pascals per second.

Figure 6:
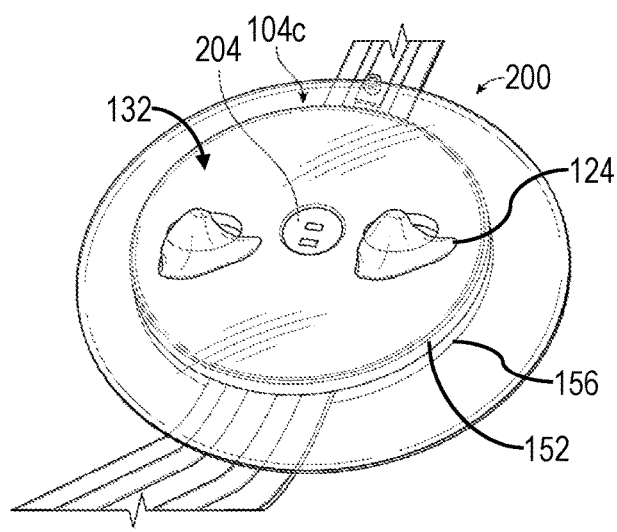
FIG. 6 is a perspective view of an exemplary embodiment of a third electrode element constructed in accordance with the present disclosure.

Referring now to FIG. 6, shown therein is a perspective view of an exemplary embodiment of a third electrode element 104c of FIG. 3 constructed in accordance with the present disclosure. The third electrode element 104c is constructed in accordance with the description of the electrode elements 104 described above with the exception that the third electrode element 104c includes a polymerized hydrogel layer 200 disposed between the bottom 132 and the semi-liquid hydrogel 124. As shown in FIG. 6, the semi-liquid hydrogel 124 may be applied to the polymerized hydrogel layer 200. Additionally, in some embodiments, the polymerized hydrogel layer 200 includes an optional central perforation 204 extending through the polymerized hydrogel layer 200 thereby allowing at least some of the semi-liquid hydrogel 124 to come into contact with the third electrode element 104c and/or allowing at least some airflow between the third electrode element 104c and the patient's skin.

In one embodiment, the polymerized hydrogel layer 200 is devoid of any perforation, such as the central perforation 204.

In one embodiment, a quantity (or volume) of the semi-liquid hydrogel 124 is disposed upon the polymerized hydrogel layer 200. The quantity of semi-liquid hydrogel 124 deposited on the polymerized hydrogel layer 200 may vary, and may simply be sufficient to cover only a portion of the polymerized hydrogel layer 200 to bond the polymerized hydrogel layer 200 to the skin of the patient. Alternatively, the quantity of semi-liquid hydrogel 124 may be substantial enough to extend beyond the polymerized hydrogel layer 200 when the third electrode element 104c is pressed onto the surface of a patient's skin.

In one embodiment, the polymerized hydrogel layer 200 may comprise any polymerizable conductive gel(s) as set forth in, for example, U.S. Pat. No. 11,458,298, entitled "ASSEMBLIES CONTAINING TWO CONDUCTIVE GEL COMPOSITIONS AND METHODS OF PRODUCTION AND USE THEREOF" issued on Oct. 4, 2022, the entire content of which is hereby incorporated in its entirety herein.

While shown in FIG. 6 as comprising a single, central perforation 204 extending through the polymerized hydrogel layer 200, a person having ordinary skill in the art should readily appreciate that the polymerized hydrogel layer 200 may comprise any number of perforations extending through the polymerized hydrogel layer 200 capable of accomplishing the present disclosure.

In addition, while shown in FIG. 6 and elsewhere as being substantially circular in shape, a person having ordinary skill in the art should readily understand that the perforation(s) (e.g., the central perforation 204) may be any shape capable of accomplishing the present disclosure, including, but not limited to, circular, triangular, square, rectangular, pentagonal, hexagonal, heptagonal, octagonal, nonagonal, decagonal, hendecagonal, dodecagonal, any shape that is substantially similar to one of the above shapes, any shape with any number of sides capable of accomplishing the present disclosure or any other fanciful shape capable of accomplishing the present disclosure, or any combination thereof.

The perforation(s) may be of any dimension capable of accomplishing the present disclosure. For example, but not by way of limitation, a perforation may have a dimension in which the distance across a particular perforation is about 0.1 millimeter to about 3.5 millimeters, or a dimension that falls within a range of two of the above values (i.e., a dimension in a range of from about 0.1 mm to about 3.5 mm). In some embodiment, the perforation(s) may be of a dimension which is greater than 3.5 mm but less than the dimension of the third electrode element 104c.

When the polymerized hydrogel layer 200 comprises more than one perforation, the perforations may have the same or different dimension(s), as well as the same or different shapes.

The perforation(s) may be formed in and through polymerized hydrogel layer 200 via any technique capable of accomplishing the present disclosure, including, but not limited to, via dye-cutting techniques and/or laser-cutting techniques. The formation of the perforations in and through polymerized hydrogel layer 200 may be accomplished via automated or non-automated process(es).

In the non-limiting embodiment shown in FIG. 6, about 90% of the polymerized hydrogel layer 200 does not contain the central perforation 204 and thus adheres to the patient's epidermal layer, while the single, central perforation 204 comprises about 10% of the polymerized hydrogel layer 200.

Figure 7:
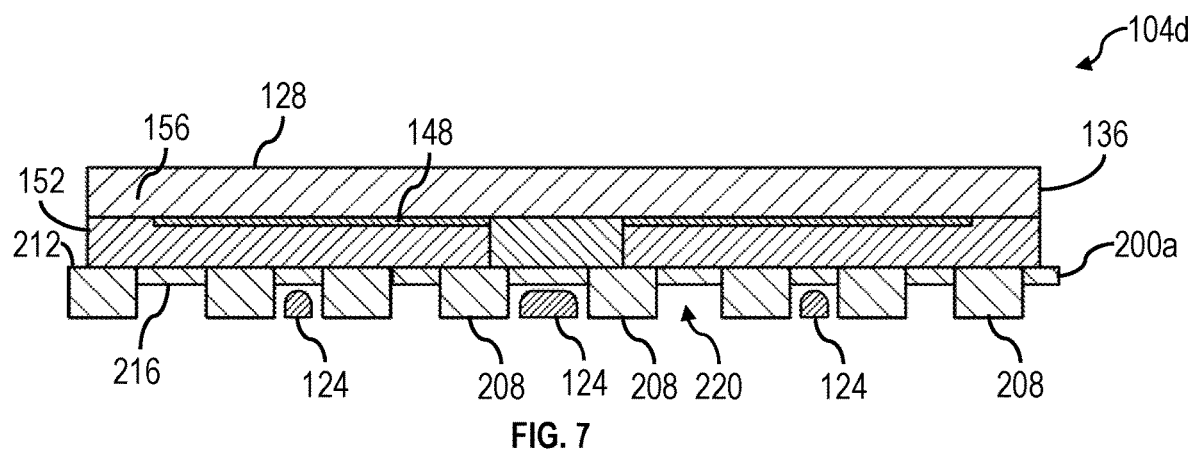
FIG. 7 is a cross-sectional view of an exemplary embodiment of a fourth electrode element constructed in accordance with the present disclosure.

Referring now to FIG. 7, shown therein is a cross-sectional view of yet another non-limiting embodiment of a fourth electrode element 104d for a TTField-generating system (e.g., the electronic apparatus 50) that is constructed in accordance with the present disclosure. The fourth electrode element 104d is constructed in accordance with the description of the electrode elements 104 described above in more detail with the exception that the fourth electrode element 104d further includes a first polymerized hydrogel layer 200a having one or more protrusion 208 (hereinafter protrusions 208).

In this non-limiting embodiment, the first polymerized hydrogel layer 200a comprises a first surface 212 that substantially adheres to the dielectric layer 152 of the fourth electrode element 104d, and a second surface 216 that has the protrusions 208 extending therefrom. The protrusion 208 assists the semi-liquid hydrogel 124 in engaging and adhering to the skin of the patient (e.g., the patient's epidermal layer), while pockets of air are introduced as a result of the spacing between two or more of the protrusions 208. In addition, at least one well or channel 220 is formed between two or more of the protrusions 208, and a volume of the semi-liquid hydrogel 124 is disposed within at least a portion of the channels 220 (or wells) between the protrusions 208.

The number of protrusions 208 present on the second surface 216 of the first polymerized hydrogel layer 200a may be any number of protrusions 208 capable of accomplishing the present disclosure. For example, but not by way of limitation, the number of protrusions 208 present may be about 1 to about 100 protrusions 208.

The protrusions 208 may be any shape capable of accomplishing the present disclosure. In addition, the protrusions 208 may be the same shape, different shapes, and/or have the same or different dimensions. In one non-limiting embodiment, the protrusions 208 may be of any height (i.e., the distance from the second surface 216 of the first polymerized hydrogel layer 200a to the patient's epidermal layer) capable of accomplishing the present disclosure. Non-limiting examples of protrusion heights that may be utilized in accordance with the present disclosure include a height of about 0.1 mm to about 3 mm.

When the first polymerized hydrogel layer 200a comprises more than one protrusion 208, the protrusions 208 may have the same or different shape(s) and dimension(s). In one non-limiting embodiment, each or all of the protrusions 208 may be tapered wherein the portion of the protrusion 208 formed on the second surface 216 of the first polymerized hydrogel layer 200a may have a larger surface area than the portion of the protrusion 208 contacting the patient's epidermal layer—or vice versa.

When the semi-liquid hydrogel 124 is disposed within any of the perforations, indentations, recesses, and/or channels of the first polymerized hydrogel layer 200a, the semi-liquid hydrogel 124 may fill only a portion of the perforations, indentations, recesses, and/or channels. Alternatively (and/or in addition thereto), the semi-liquid hydrogel 124 may substantially fill the perforations, indentations, recesses, and/or channels. In yet another alternative, the perforations, indentations, recesses, and/or channels may contain an excess of the semi-liquid hydrogel 124 that extends beyond the perforations, indentations, recesses, and/or channels—in response to application to a patient's skin the presence of excess semi-liquid hydrogel 124 may decrease resistivity of the system and thereby enhance the strength of the TTField.

In certain non-limiting embodiments, any transducer array 70 described herein further includes a liner disposed on at least a portion of the second surface 144 of the semi-liquid hydrogel 124 and/or the second surface 216 of the first polymerized hydrogel layer 200a.

Figure 8:
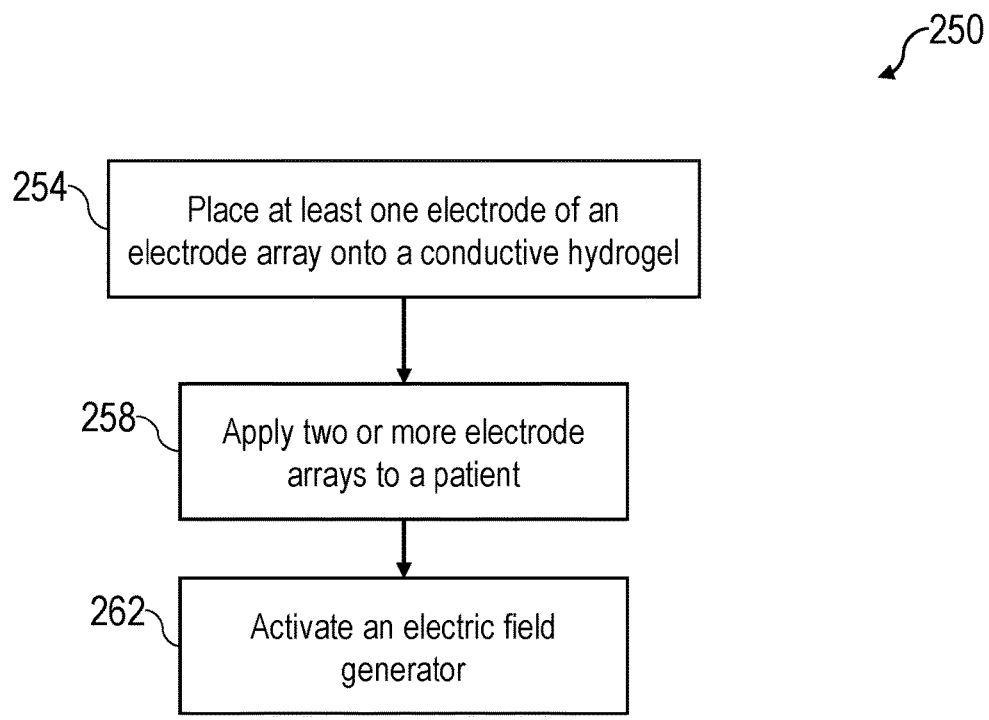
FIG. 8 is a process flow diagram of an exemplary embodiment of a process for use of the various embodiments of the transducer arrays constructed in accordance with the present disclosure.

Referring now to FIG. 8, shown therein is a flow diagram of an exemplary embodiment of a process 250 for use of the various embodiments of the transducer arrays 70 constructed in accordance with the present disclosure. The process 250 generally comprises the steps of: placing at least one electrode element of a transducer array onto a hydrogel layer (step 254); applying two or more transducer arrays associated with conductive hydrogel onto a patient (step 258); and activating the electric field generator (step 262).

In one embodiment, placing at least one electrode element of a transducer array onto a hydrogel layer (step 254) may include pressing one or more electrode element 104 of the transducer array 70 onto the semi-liquid hydrogel 124 such that each electrode element 104 is in contact with and/or adheres to the semi-liquid hydrogel 124.

In one embodiment, placing at least one electrode element of a transducer array onto a hydrogel layer (step 254) may include pressing one or more electrode element 104 of the transducer array 70 onto the polymerized hydrogel layer 200 such that each electrode element 104 is in contact with and/or adheres to the polymerized hydrogel layer 200. This embodiment may further include disposing the semi-liquid hydrogel 124 against the polymerized hydrogel layer 200 and/or against the skin of the patient at a location on the patient associated with the treatment area. In some embodiments, the first polymerized hydrogel layer 200a may be substituted for the polymerized hydrogel layer 200.

In one embodiment, applying two or more electrode arrays onto a patient (step 258) may include applying the first transducer array 70a at a first location in a treatment area associated with a target region and applying the second transducer array 70b at a second location on the patient such that the alternating electric fields (e.g., TTFields) pass through at least a portion of the target region, such as a tumor. In one embodiment, the TTField is generated within a target region of the patient. The target region typically comprises at least one tumor, and the generation of the TTField selectively destroys or inhibits growth of the tumor.

In one embodiment, applying two or more transducer arrays onto a patient (step 258) may be performed simultaneously with step 254.

In one embodiment, applying two or more transducer arrays onto a patient (step 258) may include applying two or more pairs of transducer arrays 70 onto the skin of a patient.

In one embodiment, activating the electric field generator (step 262), may include circuitry of the electric field generator 54 generating a TTField for a period of time. In one embodiment, the TTField may be generated at two or more different frequencies. When two or more frequencies are present, each frequency is selected from any value suitable for a TTField, or a range formed from any value suitable for a TTField, as described above.

In one embodiment, each transducer array 70 is maintained upon the patient's skin for at least about three days.

In one embodiment, the process 250 further includes the steps of: removing the transducer array from the patient's skin; preparing the patient's skin for another treatment (such as, but not limited to, cleansing of the skin and shaving of the skin, if necessary); and repeating steps 254-262. In addition, this process 250 can be repeated as many times as necessary.

When steps 254-258 are repeated, the electrode elements 104 or transducer arrays 70 (in combination with the semi-liquid hydrogel 124) may be placed in different positions than the original placement; relocation of the transducer arrays 70 in this manner further minimizes any dAEs that may occur.

In some embodiments, the semi-liquid hydrogel 124 may be placed on the patient prior to placing at least one of the electrode element 104 of the transducer array 70 onto the semi-liquid hydrogel 124 (step 254). Instead, step 254 and step 258 may be combined such that, when the semi-liquid hydrogel 124 is already placed on the patient, placing the at least one electrode element 104 of the transducer array 70 onto the hydrogel layer (step 254) includes applying the tow or more transducer arrays 70 to the patient (step 258).

Second Aspect

A second aspect of certain non-limiting embodiments includes an electrode element 104 comprising at least one electrode assembly 464 and a foamed conductive hydrogel for placement between the at least one electrode assembly 464 and a patient's skin. The foamed conductive hydrogel has a first surface and a second surface. The first surface of the foamed conductive hydrogel is connected to the at least one electrode assembly. The second surface of the foamed conductive hydrogel is for application to the patient's skin.

Figure 9A:
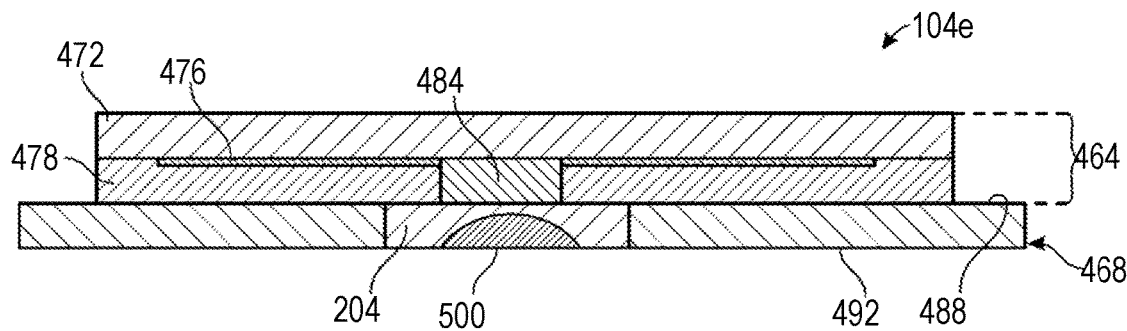
FIG. 9A is a cross-sectional view of an exemplary embodiment of a second aspect of a fifth electrode element constructed in accordance with the present disclosure.

Referring now to FIG. 9A, shown therein is an exemplary embodiment of a cross-sectional view of one non-limiting embodiment of a fifth electrode element 104e constructed in accordance with the present disclosure. As shown in FIG. 9A, the fifth electrode element 104e comprises at least one electrode assembly 464 and a hydrogel layer 468. The at least one electrode assembly 464 comprises at least one non-conducting layer 472, at least one conducting layer 476 (e.g., constructed in accordance with the electrode layer 148 described above in more detail), and a dielectric layer 478 having at least one optional opening 484 disposed at least partially therethrough.

In one embodiment, as shown in FIG. 9A, the hydrogel layer 468 may be a polymerized hydrogel comprising a first surface 488 and a second surface 492 wherein a single, central perforation 204 extends from the second surface 492 to the first surface 488 thereof and thus through the hydrogel layer 468. A quantity of a polymerized foamed hydrogel 500 may be deposited and/or disposed within at least a portion of the central perforation 204. In one embodiment, the hydrogel layer 468 may be constructed in accordance with the polymerized hydrogel layer 200 and/or the first polymerized hydrogel layer 200a, discussed above in more detail.

In one embodiment, the polymerized foamed hydrogel 500 is an open-cell, single-phase foam constructed of polymerized, aerated liquid hydrogel. In one embodiment, the polymerized foamed hydrogel 500 may be in a foamed liquid state having many air bubbles interspersed throughout. In this state, the polymerized foamed hydrogel 500 is sticky (e.g., has a high skin cohesion rate) and assists in bonding the electrode assembly 464 to the skin of the patient when the fifth electrode element 104e is applied to the patient. The polymerized foamed hydrogel 500 is also light weight and may be worn comfortably by the patient.

In some embodiments, the polymerized foamed hydrogel 500 may comprise one or more of the following chemical and structural features/properties: a polymer chain length in a range of from about 1 nm to about 200 nm; a free salt present at a concentration in a range of from about 0.1 mM to about 1 M; a pH in a range of from about 6 to about 8 and preferably about 6.8 or within a range of about 6.3-7.3; a volume resistivity of less than about 100 Ohm-in; and a thickness in a range of from about 10 mil to about 50 mil.

In some embodiments, the polymerized foamed hydrogel 500 may, instead, be non-polymerized. In these embodiments, it should be understood, however, that non-polymerized foamed hydrogel should be used where it is desirable that the foamed hydrogel collapse, e.g., bubbles of the non-polymerized hydrogel collapse. However, when foamed hydrogel is polymerized, the bubbles do not collapse with time, e.g., the bubbles are polymerized in place.

In one embodiment, the electrode assembly 464 of the fifth electrode element 104e may be constructed in accordance with any electrode element 104 of any transducer array 70 as described above. For example, in one embodiment, the electrode assembly 464 of the fifth electrode element 104e is constructed in accordance with the first electrode element 104a or the second electrode element 104b of the transducer array 70 (shown in FIG. 4). In another embodiment, the electrode assembly 464 of the fifth electrode element 104e is constructed in accordance with the third electrode element 104c of the third transducer array 70c.

In one embodiment, the polymerized foamed hydrogel 500 may simply be deposited upon an existing surface of the hydrogel layer 468, and this may be accomplished by any manner known in the art. Alternatively, the hydrogel layer 468 may be provided with one or more types of modifications (e.g., perforations, indentations, recesses, openings, protrusions, and/or channels), and the polymerized foamed hydrogel 500 may be deposited/disposed within or in between one or more of these modifications. Various non-limiting examples of modifications to the hydrogel layer 468 may be utilized in accordance with the present disclosure.

Figure 9B:
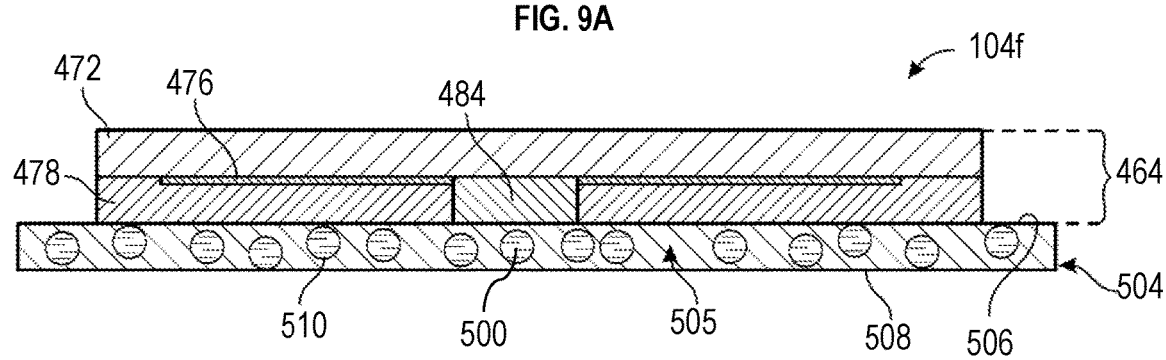
FIG. 9B is a cross-sectional view of an exemplary embodiment of the second aspect of a sixth electrode element constructed in accordance with the present disclosure.

Referring now to FIG. 9B, shown therein is an exemplary embodiment of a cross-sectional view of one non-limiting embodiment of a sixth electrode element 104f constructed in accordance with the present disclosure, with the exception that the hydrogel layer 468 is replaced with a non-gel conductive material 504. In this embodiment, the non-gel conductive material 504 is constructed of a matrix material 505 such as conductive foam material (e.g., a silver foam) receiving a quantity of polymerized foamed hydrogel 500. For example, the matrix material 505 may be formed of an open cell foam having a plurality of pockets 510 (e.g., cells, bubbles or other openings) configured to receive a quantity of the polymerized foamed hydrogel 500. The matrix material 505 comprises a first surface 506 and a second surface 508. In one embodiment, a quantity of polymerized foamed hydrogel 500 may be deposited/disposed on or within the matrix material 505, e.g., within the plurality of pockets 510.

In one embodiment, the non-gel conductive material 504 comprises a solid continuous phase material constructed of a conductive material defining the plurality of pockets 510 interspersed throughout the solid continuous phase material. The polymerized foamed hydrogel 500 may be disposed within at least a portion of the plurality of pockets 510.

In one embodiment, the non-gel conductive material 504 is one or more of an open cell foam or a closed cell foam. For example, in one embodiment, a first portion of the matrix material 505 of the non-gel conductive material 504 is an open-cell conductive foam while a second portion of the matrix material 505 is a closed-cell conductive foam. In another embodiment, the matrix material 505 is formed of open-cells and closed-cells interspersed with each other. In another embodiment, the matrix material 505 is formed only of open-cell foam and does not include closed-cell foam. In yet another embodiment, the matrix material 505 is formed only of closed-cell foam and does not include open-cell foam.

In one embodiment, the non-gel conductive material 504 includes the matrix material 505 being a conductive foam having a solid continuous phase material being at least one of constructed of a conductive material or having a conducting material attached, absorbed, or adsorbed to the continuous phase material, and defining a plurality of pockets interspersed throughout the solid continuous phase material. In some embodiments, the quantity of polymerized foamed hydrogel 500 is positioned within at least some of the pockets. In some embodiments, the non-gel conductive material is constructed of polymerized foam hydrogel 500. Exemplary non-gel conductive material may include conductive foam such as disclosed in US Application Publication No. 2023/024,216 entitled "CONDUCTIVE PAD GENERATING TUMOR TREATING FIELD AND METHODS OF PRODUCTION AND USE THEREOF" published on Jan. 26, 2023, the entire content of which is hereby incorporated herein in its entirety.

It should be understood that, as disclosed herein, the non-gel conductive material 504 may be used in place of the hydrogel layer 468, the first hydrogel layer 468a (described below), and the hydrogel layer 532, discussed below, unless otherwise stated to the contrary. For example, the non-gel conductive material 504 may be formed to include one or more perforation, protrusion, indentation, recess, or channel operable to receive, support, or otherwise be in contact with, the polymerized foamed hydrogel 500 similar to the construction or formation of the hydrogel layers 468, 468a, and 532 herein described. Similarly, in one embodiment, the semi-liquid hydrogel 124, described above, may be replaced with the polymerized foamed hydrogel 500 in each electrode element 104 herein described. In one embodiment, the hydrogel layer 468 and/or the first hydrogel layer 468a may be referred to as a polymerized substrate.

Figure 9C:
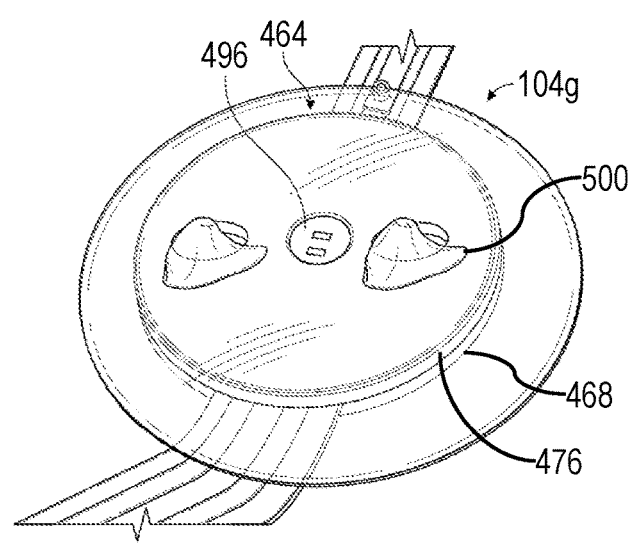
FIG. 9C is a bottom perspective view of a second aspect of a seventh electrode element constructed in accordance with the present disclosure.

Referring now to FIG. 9C, shown therein is a perspective view of an exemplary embodiment of a seventh electrode element 104g constructed in accordance with the present disclosure. The seventh electrode element 104g includes the at least one conducting layer 476 having the hydrogel layer 468 disposed thereon.

In one non-limiting embodiment, the at least one conducting layer 476 comprises and/or consists of at least one conducting element and/or compound, including, by way of example only, elemental silver. In one non-limiting embodiment, the dielectric layer 478 comprises and/or consists of ceramic, and the (optional) central perforation 204 contains and/or is coated (for instance, an inner perimeter of the (optional) central perforation 204 is coated) with at least one epoxy and/or at least one temperature sensor.

In one embodiment, the polymerized foamed hydrogel 500 is "soft", that is, the polymerized foamed hydrogel 500 may have a high compliance. The polymerized foamed hydrogel 500 may be biased towards a first shape, such that when deformed, e.g., compressed, to a second shape, the polymerized foamed hydrogel 500 may expand to re-form into the first shape. If compression is continually applied to the polymerized foamed hydrogel 500, the polymerized foamed hydrogel 500 may expand to conform to a surface causing the compression. For example, if the polymerized foamed hydrogel 500 is compressed against a patient's skin, the polymerized foamed hydrogel 500 may expand to conform to the contours of the patient's skin. In this manner, the polymerized foamed hydrogel 500 may have a high contact between the polymerized foamed hydrogel 500 and the patient's skin.

In one embodiment, the polymerized foamed hydrogel 500 comprises an open-cell, polymerized hydrogel. Each cell of the polymerized foamed hydrogel 500 may be filled with air, e.g., is devoid of polymerized hydrogel or liquid hydrogel. In this manner, a density of the polymerized foamed hydrogel 500 may be lesser than a density of a non-aerated polymerized hydrogel (e.g., a solid conductive hydrogel), thereby reducing a weight of the hydrogel layer 468 when applied to the patient.

In one embodiment, the hydrogel layer 468 comprises polymerized foamed hydrogel 500. In this embodiment, the hydrogel layer 468 comprises the polymerized foamed hydrogel 500 in contact with both the electrode assembly 464 and the patient's skin. In another embodiment, the hydrogel layer 468 formed of polymerized foamed hydrogel 500 does not include a non-aerated, polymerized hydrogel disposed between an insulated one of the electrode assembly 464 and the patient's skin.

In one embodiment, the polymerized foamed hydrogel 500 is formed by forcing air through liquid hydrogel at a high-pressure thereby causing bubbles to form in the liquid hydrogel. After a sufficient number of bubbles are formed in the liquid hydrogel, the liquid hydrogel may have a polymerization agent applied thereto, thereby causing the liquid hydrogel to polymerize with the bubbles that are formed in the hydrogel.

In one embodiment, when the hydrogel is a two-part hydrogel that polymerized after mixing both parts together, the polymerized foamed hydrogel 500 may be formed by first mixing the two parts of liquid hydrogel together and, prior to polymerization of the two parts, expressing the mixed liquid hydrogel through a nozzle with forced air.

In one embodiment, the polymerized foamed hydrogel 500 is formed by agitating liquid hydrogel to incorporate air bubbles. For example, the liquid hydrogel may be agitated using a whisk or other frother or frother utensil. Once a sufficient number of bubbles are formed in the liquid hydrogel, and before a number of bubbles collapse a polymerization agent applied.

In one embodiment, the polymerized foamed hydrogel 500 includes one or more surfactant added to the liquid hydrogel prior to agitation. The one or more surfactant may include, for example, a foaming agent. In one embodiment, the surfactant is a non-ionic surfactant. One exemplary surfactant that may be used is Ike's Grip-Stick (Middlesex, NC), part number 9656396531.

In one embodiment, the polymerized foamed hydrogel 500 is a light-weight, solid media with high surface area, extreme compliance, and adhesive properties.

In some embodiments, the polymerized foamed hydrogel 500 includes low-density bubbles. In these embodiments, the polymerized foamed hydrogel 500 is less dense than non-foamed, polymerized hydrogel but retains other characteristics of the non-foamed, polymerized hydrogel. Additionally, the polymerized foamed hydrogel 500 having the low-density bubbles offers a greater degree of compliance than that of the non-foamed, polymerized hydrogel.

The polymerized foamed hydrogel 500 may generally hold its shape without external application of pressure.

In one embodiment, the hydrogel layer 468 is a polymerized foamed hydrogel 500. In some embodiments, the hydrogel layer 468 is devoid of any perforation, such as the central perforation 496.

In one embodiment, a quantity of polymerized foamed hydrogel 500 is disposed upon the hydrogel layer 468. The amount of polymerized foamed hydrogel 500 deposited on the hydrogel layer 468 may vary, and may simply be sufficient to cover only a portion of the hydrogel layer 468 to bond the hydrogel layer 468 to the skin of the patient. Alternatively, the volume of polymerized foamed hydrogel 500 may be substantial enough to extend beyond the hydrogel layer 468 when the seventh electrode element 104g is pressed onto the surface of a patient's skin.

In one embodiment, the first hydrogel layer 468a may comprise any polymerizable conductive gel(s) as set forth in greater detail elsewhere herein. While shown in FIGS. 9A-9C as comprising a single, central perforation 496 extending through the hydrogel layer 468, a person having ordinary skill in the art should readily appreciate that the hydrogel layer 468 may comprise any number of perforations extending through the hydrogel layer 468 capable of accomplishing the present disclosure.

In addition, while shown in FIGS. 9A-9C and elsewhere as being substantially circular in shape, a person having ordinary skill in the art should readily understand that the perforation(s) (e.g., central perforation 496) may be any shape capable of accomplishing the present disclosure, including, but not limited to, circular, triangular, square, rectangular, pentagonal, hexagonal, heptagonal, octagonal, nonagonal, decagonal, hendecagonal, dodecagonal, any shape that is substantially similar to one of the above shapes, any shape with any number of sides capable of accomplishing the present disclosure or any other fanciful shape capable of accomplishing the present disclosure, or any combination thereof.

The perforation(s) may be of any dimension capable of accomplishing the present disclosure. For example, but not by way of limitation, a perforation may have a dimension in which the distance across a particular perforation is about 0.1 millimeter to about 3.5 millimeters, or a dimension that falls within a range of two of the above values (i.e., a dimension in a range of from about 0.1 mm to about 3.5 mm). In some embodiment, the perforation(s) may be of a dimension which is greater than 3.5 mm but less than the dimension of the electrode assembly 464.

When the first hydrogel layer 468a comprises more than one perforation, the perforations may have the same or different dimension(s), as well as the same or different shapes.

The perforation(s) may be formed in and through the hydrogel layer 468 via any technique capable of accomplishing the present disclosure, including, but not limited to, via dye-cutting techniques and/or laser-cutting techniques. The formation of the perforations in and through the hydrogel layer 468 may be accomplished via automated or non-automated process(es).

In the non-limiting embodiment shown in FIGS. 9A-9C, about 90% of the hydrogel layer 468 does not contain the central perforation 496 and thus adheres to the patient's epidermal layer, while the single, central perforation 496 comprises about 10% of the hydrogel layer 468.

Figure 10A:
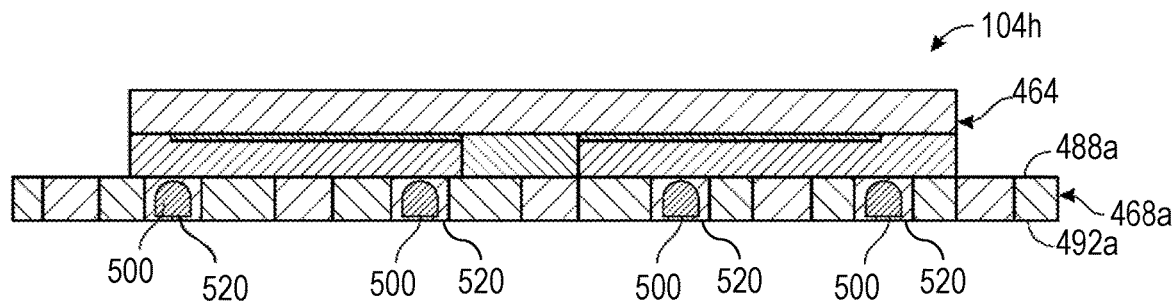
FIG. 10A is a cross-sectional view of another exemplary embodiment of the second aspect of an eighth electrode element constructed in accordance with the present disclosure.

Referring now to FIG. 10A, shown therein is another non-limiting embodiment of an eighth electrode element 104h constructed in accordance with the present disclosure. The eighth electrode element 104h is similar to the fifth electrode element 104e, the sixth electrode element 104f, and the seventh electrode element 104g, described above in reference to FIGS. 9A-9C and includes an electrode assembly 464. The eighth electrode element 104h further includes the first hydrogel layer 468a that comprises a first surface 488a and a second surface 492a wherein multiple perforations 520 (similar to the central perforation 496) extend from the second surface 492a to the first surface 488a through the first hydrogel layer 468a. Then a quantity of polymerized foamed hydrogel 500 is deposited/disposed within at least a portion of at least one of the perforations 520.

In the non-limiting embodiment shown in FIG. 10A, about 50% of the first hydrogel layer 468a does not contain perforations 520 and thus adheres to the patient's epidermal layer, while the multiple perforations 520 comprise about 50% of the first hydrogel layer 468a such that the polymerized foamed hydrogel 500 assists in bonding the eighth electrode element 104h to the skin of the patient.

Figure 10B:
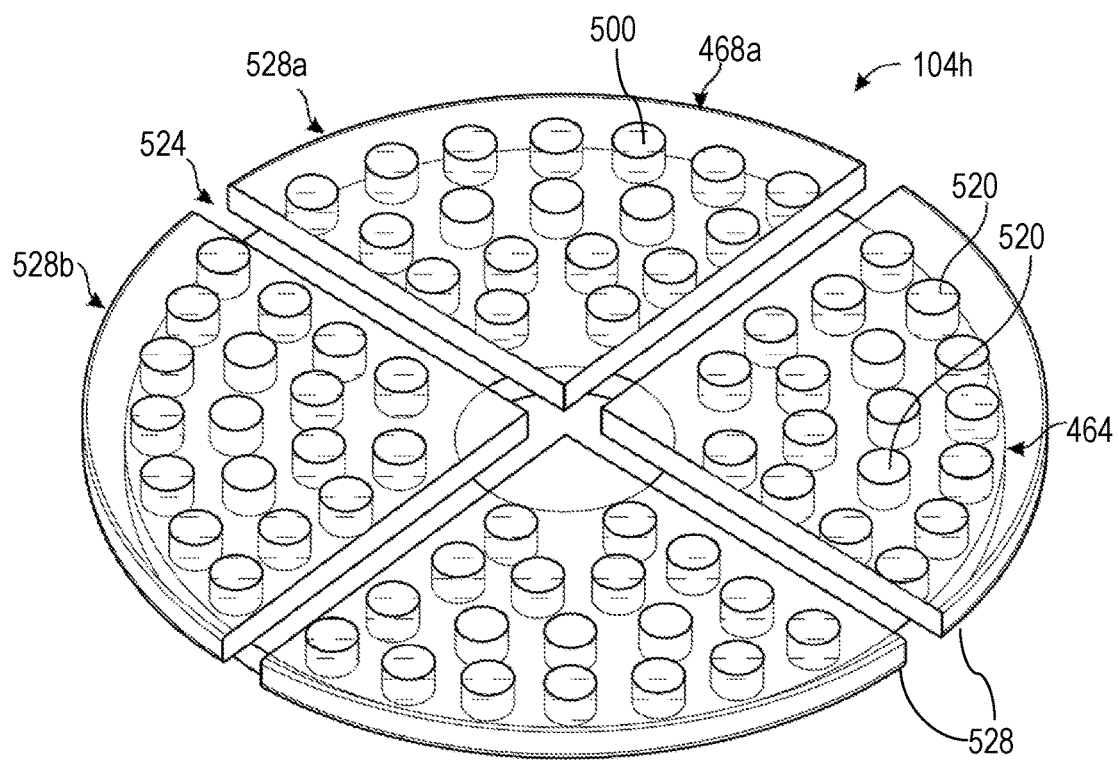
FIG. 10B is a bottom perspective view of another exemplary embodiment of the second aspect of an assembly constructed in accordance with the present disclosure.

Referring now to FIG. 10B, shown therein is a bottom perspective view of an exemplary embodiment of the eighth electrode element 104h constructed in accordance with the present disclosure. The eighth electrode element 104h includes the electrode assembly 464 having the first hydrogel layer 468a disposed thereon.

As shown in FIG. 10B, the first hydrogel layer 468a may include a plurality of perforations 520 as well as one or more channel 524 formed between two segments 528 (e.g., a first segment 528a and a second segment 528b) of the first hydrogel layer 468a.

In one embodiment, the first hydrogel layer 468a is formed of polymerized foamed hydrogel 500. For example, the first hydrogel layer 468a is formed of the polymerized foamed hydrogel 500 having a low flowability. In this embodiment, when a force is applied to the first hydrogel layer 468a thereby deforming the first hydrogel layer 468a from its first shape into a second shape and causing the perforations 520 to collapse, any substance (such as a flowable hydrogel, semi-liquid hydrogel, liquid hydrogel, or foamed hydrogel) within the perforations 520 is deposited outside the perforations 520. When the force is removed, the first hydrogel layer 468a will reform into its first shape such that the perforations 520 are reformed. In this manner, if the perforations 520 are filled with a flowable hydrogel, e.g., a liquid hydrogel, a non-polymerized foamed hydrogel, a semi-liquid hydrogel, and/or a liquid foamed hydrogel, and, when the eighth electrode element 104h is placed on the skin of the patient, the force used to apply the eighth electrode element 104h to the patient causes the flowable hydrogel to be deposited between the first hydrogel layer 468a and the skin of the patient, thereby increasing adhesion of the eighth electrode element 104h to the patient as well as increasing conductivity at the array-skin interface, e.g., where the transducer array 70 contacts the patient's skin.

In one embodiment, at least a portion (or all) of the perforations 520, in any of the first hydrogel layer 468a constructed of polymerized foamed hydrogel 500 may be filled with air.

Figure 11A:
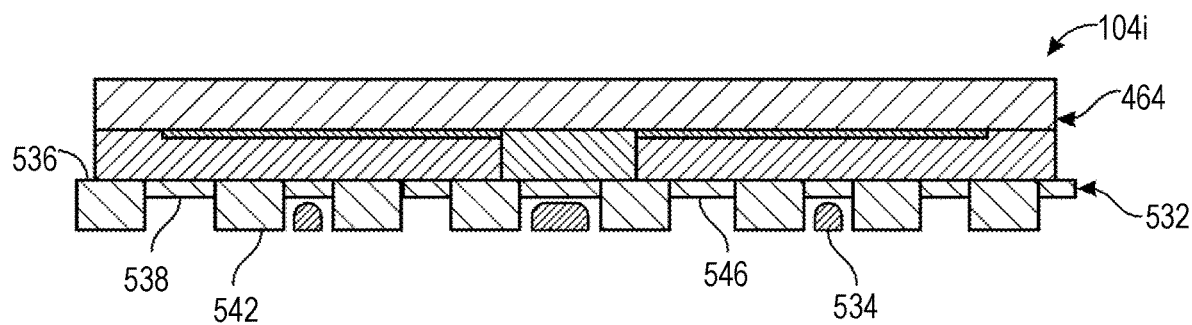
FIG. 11A is a cross-sectional view of another exemplary embodiment of the second aspect of a ninth electrode element constructed in accordance with the present disclosure.
Figure 11B:
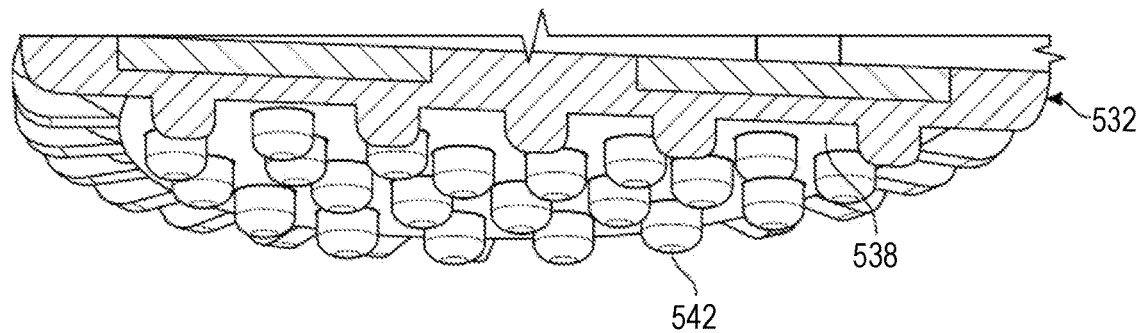
FIG. 11B is a schematic illustration of a hydrogel layer of the ninth electrode element of FIG. 11A.

Referring now to FIG. 11A and FIG. 11B, shown therein is a cross-sectional view of yet another non-limiting embodiment of a ninth electrode element 104i constructed in accordance with the present disclosure. The ninth electrode element 104i contains at least one electrode assembly 464 and a hydrogel layer 532. In one embodiment, the hydrogel layer 532 is constructed of a polymerized foamed hydrogel 500, whereas in another embodiment, the hydrogel layer 532 is constructed of the matrix material 505 in combination with a non-polymerized foamed hydrogel 534. In yet another embodiment, the hydrogel layer 532 is constructed in accordance with the polymerized hydrogel layer 200 and/or the first polymerized hydrogel layer 200a. In one embodiment, the non-polymerized foamed hydrogel 534 may be a liquid foamed hydrogel.

In this non-limiting embodiment, the hydrogel layer 532 comprises a first surface 536 that substantially adheres to the electrode assembly 464, and a second surface 538 that has a plurality of protrusions 542 extending therefrom. The at least one of the protrusions 542 engages and adheres to the patient's epidermal layer, while pockets of air are introduced as a result of the spacing between two or more of the protrusions 542. In addition, at least one well or channel 546 is formed between two or more of the protrusions 542, and a volume of the polymerized foamed hydrogel 500 or the non-polymerized foamed hydrogel 534 is disposed within at least a portion of the at least one well or channel 546. In one embodiment, the protrusions 542 may be constructed in accordance with the protrusions 208 described above.

The number of protrusions 542 present on the second surface 538 of the hydrogel layer 532 may be any number of protrusions 542 capable of accomplishing the present disclosure. For example, but not by way of limitation, the number of protrusions 542 present may be about 1 to about 100 protrusions 542.

The protrusions 542 may be any shape capable of accomplishing the present disclosure. In addition, the protrusions 542 may be the same shape, different shapes, and/or have the same or different dimensions. In one non-limiting embodiment, the protrusions 542 may be of any height (i.e., the distance from the second surface 538 of the hydrogel layer 532 to the patient's epidermal layer) capable of accomplishing the present disclosure. Non-limiting examples of protrusion heights that may be utilized in accordance with the present disclosure include a height of about 0.1 mm to about 3 mm.

When the hydrogel layer 532 comprises more than one protrusion 542, the multiple protrusions 542 may have the same or different shapes and dimension(s). In one non-limiting embodiment, each or all of the protrusions 542 may be tapered wherein the portion of the protrusions 542 formed on the second surface 538 of the hydrogel layer 532 may have a larger diameter than the portion of the protrusions 542 contacting the patient's epidermal layer—or vice versa.

In the non-limiting embodiment shown in FIGS. 11A-11B, about 50% of the hydrogel layer 532 can be in contact with the patient's epidermal layer and comprises the multiple protrusions 542.

When non-polymerized foamed hydrogel 534 (and/or liquid foamed hydrogel) is disposed within any of the perforations, indentations, recesses, and/or channels of the hydrogel layers 532, 468, 468a, the non-polymerized foamed hydrogel 534 may fill only a portion of the perforations, indentations, recesses, and/or channels. Alternatively (and/or in addition thereto), the non-polymerized foamed hydrogel 534 may substantially fill the perforations, indentations, recesses, and/or channels. In yet another alternative, the perforations, indentations, recesses, and/or channels may contain an excess of non-polymerized foamed hydrogel 534 that extends beyond the perforations, indentations, recesses, and/or channels in response to application to a patient's skin; the presence of an excess of non-polymerized foamed hydrogel 534 may decrease resistivity of the system and thereby enhance the strength of the TTField.

In certain non-limiting embodiments, any assembly described above further includes a liner disposed on at least a portion of the second surface of the hydrogel layer. The liner may be a removable, non-conductive liner.

In one embodiment, a method of use includes: (1) applying any of the electrode elements or transducer arrays disclosed or otherwise contemplated herein to a skin of a patient; and (2) generating a TTField for a period of time. In one embodiment, the TTField may be generated at two or more different frequencies. When two or more frequencies are present, each frequency is selected from any value suitable for a TTField, or a range formed from any value suitable for a TTField.

In one embodiment, the electrode element/transducer array is maintained upon the patient's skin for at least about three days.

In one embodiment, step (1) includes applying at least two pairs of transducer arrays, each along with a polymerized foamed hydrogel disposed upon the electrode elements, or polymerized hydrogel, thereof, to the patient's skin.

In one embodiment, the TTField is generated within a target region of the patient. The target region typically comprises at least one tumor, and the generation of the TTField selectively destroys or inhibits growth of the tumor.

In one embodiment, the method further includes the steps of: (3) removing the electrode elements/transducer array from the patient's skin; (4) preparing the patient's skin for another treatment (such as, but not limited to, cleansing of the skin, trimming hair on the skin, or shaving of the skin, if necessary); and (5) repeating steps (1)-(2). In addition, this cycle of steps (1)-(5) can be repeated as many times as necessary.

When steps (1)-(2) are repeated, the electrode elements/transducer arrays (together with the hydrogels) may be placed in different positions than the original placement; relocation of the electrode elements/transducer arrays in this manner further minimizes any dAEs that may occur.

ILLUSTRATIVE EMBODIMENTS

Illustrative Embodiment 1. An assembly, comprising:
at least one electrode; and
a semi-liquid hydrogel having a viscosity of between 8440 and 20000 milli pascals per second, wherein the semi-liquid hydrogel is disposed between a surface of the at least one electrode and a patient's skin.

Illustrative Embodiment 2. The assembly of Illustrative Embodiment 1, further comprising a liner disposed on the semi-liquid hydrogel and covering at least a portion of the semi-liquid hydrogel.

Illustrative Embodiment 3. The assembly of Illustrative Embodiment 1, wherein the semi-liquid hydrogel has a skin adhesion rate within a range of about 300 g/inch to about 600 g/inch.

Illustrative Embodiment 4. The assembly of Illustrative Embodiment 1, wherein the assembly further comprises a polymerized hydrogel disposed between the surface of the at least one electrode and the semi-liquid hydrogel.

Illustrative Embodiment 5. The assembly of Illustrative Embodiment 4, wherein the polymerized hydrogel is devoid of perforations.

Illustrative Embodiment 6. The assembly of Illustrative Embodiment 4, wherein the polymerized hydrogel comprises at least one modification that extends inwardly or outwardly from the second surface thereof.

Illustrative Embodiment 7. The assembly of Illustrative Embodiment 6, wherein the at least one modification is one or more of:
a perforation extending inwardly from the second surface to the first surface thereof and through the polymerized hydrogel;
a recess, channel, or well extending inwardly from the second surface of the polymerized hydrogel;
a plurality of protrusions extending outwardly from the second surface thereof, and wherein two or more protrusions form a recess, channel, or well therebetween; and
combinations thereof.

Illustrative Embodiment 8. The assembly of Illustrative Embodiment 7, wherein at least a portion of the semi-liquid hydrogel is disposed in or associated with the at least one modification.

Illustrative Embodiment 9. The assembly of Illustrative Embodiment 8, wherein the polymerized hydrogel comprises a plurality of modifications that extend inwardly or outwardly from the second surface thereof, and wherein the plurality of modifications has semi-liquid hydrogel disposed therein or associated therewith.

Illustrative Embodiment 10. The assembly of Illustrative Embodiment 8, wherein the polymerized hydrogel comprises a plurality of modifications that extend inwardly or outwardly from the second surface thereof, and wherein at least a portion of the plurality of modifications have semi-liquid hydrogel disposed therein or associated therewith, while at least a portion of the plurality of modifications are substantially devoid of semi-liquid hydrogel.

Illustrative Embodiment 11. The assembly of Illustrative Embodiment 1, wherein the semi-liquid hydrogel has a pH of about 6.8.

Illustrative Embodiment 12. A method, comprising:
applying two or more transducer arrays to a skin of a patient, each transducer array comprising at least one electrode; a semi-liquid hydrogel having a viscosity of between about 8440 and 20000 milli pascals per second, wherein the semi-liquid hydrogel is disposed between a surface of the at least one electrode and a patient's skin; and activating a generator to supply an electrical signal to the two or more transducer arrays thereby generating an electric field for a period of time.

Illustrative Embodiment 13. The method of Illustrative Embodiment 12, wherein activating the generator further comprises activating the generator to supply the electrical signal having an alternating current waveform at frequencies in a range of from about 50 kHz to about 1 MHz.

Illustrative Embodiment 14. A system, comprising:
an electric field generator operable to generate an electrical signal having an alternating current waveform at a frequency in a range from 50 kHz to 1 MHz;
a first conductive lead electrically coupled to the electric field generator, the first conductive lead configured to carry the electrical signal;
a first transducer array having a first electrode element in electrical communication with a first conductive gel element; the first conductive gel element comprising at least a semi-liquid hydrogel, the semi-liquid hydrogel having a viscosity of between about 8440 and 20000 milli pascals per second, wherein the semi-liquid hydrogel is disposed between a surface of the at least one electrode and a patient's skin;
a second conductive lead electrically coupled to the generator, the second conductive lead configured to carry the electrical signal; and
a second transducer array having a second electrode element in electrical communication with a second conductive gel element, and the second conductive gel element being configured to be in contact with a patient's skin.

Illustrative Embodiment 15. The system of Illustrative Embodiment 14, wherein the semi-liquid hydrogel is a first semi-liquid hydrogel and wherein the second conductive gel element comprises a second semi-liquid hydrogel having a viscosity of between about 8440 and 20000 milli pascals per second, wherein the second semi-liquid hydrogel is disposed between a surface of the at least one electrode and a patient's skin.

Illustrative Embodiment 16. The system of Illustrative Embodiment 14, wherein the system further comprises a polymerized hydrogel disposed between the surface of the at least one electrode and the semi-liquid hydrogel.

Illustrative Embodiment 17. The system of Illustrative Embodiment 16, wherein the polymerized hydrogel is devoid of perforations.

Illustrative Embodiment 18. The system of Illustrative Embodiment 16, wherein the polymerized hydrogel comprises at least one modification that extends inwardly or outwardly from the second surface thereof.

Illustrative Embodiment 19. The system of Illustrative Embodiment 18, wherein the at least one modification is one or more of:
a perforation extending inwardly from the second surface to the first surface thereof and through the polymerized hydrogel;
a recess, channel, or well extending inwardly from the second surface of the polymerized hydrogel;
a plurality of protrusions extending outwardly from the second surface thereof, and wherein two or more protrusions form a recess, channel, or well therebetween; and
combinations thereof.

Illustrative Embodiment 20. The system of Illustrative Embodiment 19, wherein at least a portion of the semi-liquid hydrogel is disposed in or associated with the at least one modification.

Illustrative Embodiment 21. An assembly, comprising:
at least one electrode; and
a foamed conductive hydrogel for placement between the at least one electrode and a patient's skin, the foamed conductive hydrogel having a first surface and a second surface, wherein the first surface of the foamed conductive hydrogel is connected to the at least one electrode, and the second surface of the foamed conductive hydrogel is for application to the patient's skin, the foamed conductive hydrogel being polymerized.

Illustrative Embodiment 22. The assembly of Illustrative Embodiment 21, further comprising a liner disposed on the foamed conductive hydrogel and covering at least a portion of the second surface of the foamed conductive hydrogel.

Illustrative Embodiment 23. The assembly of Illustrative Embodiment 21, further comprising a polymerized conductive hydrogel between the first surface of the foamed conductive hydrogel and the at least one electrode.

Illustrative Embodiment 24. The assembly of Illustrative Embodiment 23, wherein the polymerized conductive hydrogel is devoid of perforations.

Illustrative Embodiment 25. The assembly of Illustrative Embodiment 21, further comprising a conductive foam disposed between the first surface of the foamed conductive hydrogel and the at least one electrode, the conductive foam having a solid continuous phase material constructed of a conductive material, and defining a plurality of pockets interspersed throughout the solid continuous phase material, the foamed conductive hydrogel disposed within at least a portion of the pockets, the conductive foam being one or more of an open cell foam or a closed cell foam.

Illustrative Embodiment 26. The assembly of Illustrative Embodiment 23, wherein the polymerized conductive hydrogel comprises at least one modification that extends inwardly or outwardly from the second surface thereof.

Illustrative Embodiment 27. The assembly of Illustrative Embodiment 26, wherein the at least one modification is one or more of:
a perforation extending inwardly from the second surface to the first surface thereof and through the polymerized conductive hydrogel;
a recess, channel, or well extending inwardly from the second surface of the polymerized conductive hydrogel;
a plurality of protrusions extending outwardly from the second surface thereof, and wherein two or more protrusions form a recess, channel, or well therebetween; and
combinations thereof.

Illustrative Embodiment 28. The assembly of Illustrative Embodiment 27, wherein at least a portion of the foamed conductive hydrogel is disposed in or associated with the at least one modification.

Illustrative Embodiment 29. The assembly of Illustrative Embodiment 28, wherein the polymerized conductive hydrogel comprises a plurality of modifications that extend inwardly or outwardly from the second surface thereof, and wherein at least a portion of the plurality of modifications has foamed conductive hydrogel disposed therein or associated therewith.

Illustrative Embodiment 30. The assembly of Illustrative Embodiment 21, wherein the foamed conductive hydrogel has a density less than a solid conductive hydrogel.

Illustrative Embodiment 31. The assembly of Illustrative Embodiment 21, wherein the foamed conductive hydrogel is one or more of a closed-cell foam or an open-cell foam.

Illustrative Embodiment 32. A method, comprising:
applying two or more transducer arrays to a skin of a patient, each transducer array comprising at least one electrode; a foamed conductive hydrogel placed between the at least one electrode and a patient's skin, the foamed conductive hydrogel having a first surface and a second surface, wherein the first surface of the foamed conductive hydrogel is connected to a surface of the at least one electrode and the second surface of the foamed conductive hydrogel applied to a patient's skin so as to adhere the transducer arrays to the skin of the patient; and
activating an electric field generator to supply an electrical signal to the two or more transducer arrays thereby generating an electric field for a period of time.

Illustrative Embodiment 33. The method of Illustrative Embodiment 32, wherein activating the electric field generator further comprises activating the electric field generator to supply the electrical signal having an alternating current waveform at frequencies in a range of from about 50 kHz to about 1 MHz.

Illustrative Embodiment 34. A system, comprising:
an electric field generator operable to generate an electrical signal having an alternating current waveform at a frequency in a range from 50 kHz to 1 MHz;
a first conductive lead electrically coupled to the electric field generator, the first conductive lead configured to carry the electrical signal;
a first electrode element having a first electrode assembly in electrical communication with a first conductive gel element; the first conductive gel element comprising a foamed conductive hydrogel;
a second conductive lead electrically coupled to the generator, the second conductive lead configured to carry the electrical signal; and
a second electrode element having a second electrode assembly in electrical communication with a second conductive gel element, and the second conductive gel element being configured to be in contact with a patient's skin.

Illustrative Embodiment 35. The system of Illustrative Embodiment 34, wherein the second conductive gel element comprises a foamed conductive hydrogel for disposal on at least a portion of a patient's skin.

Illustrative Embodiment 36. The system of Illustrative Embodiment 34, wherein the foamed conductive hydrogel includes a polymerized substrate containing a plurality of pockets containing a gas.

Illustrative Embodiment 37. The system of Illustrative Embodiment 34, further comprising a polymerized conductive hydrogel having a first surface and a second surface, and positioned between the first electrode assembly and the first conductive gel element.

Illustrative Embodiment 38. The system of Illustrative Embodiment 37, wherein the polymerized conductive hydrogel comprises at least one modification that extends inwardly or outwardly from the second surface thereof.

Illustrative Embodiment 39. The system of Illustrative Embodiment 38, wherein the at least one modification is one or more of:

a perforation extending inwardly from the second surface to the first surface thereof and through the polymerized conductive hydrogel;
a recess, channel, or well extending inwardly from the second surface of the polymerized conductive hydrogel;
a plurality of protrusions extending outwardly from the second surface thereof, and wherein two or more protrusions form a recess, channel, or well therebetween; and
combinations thereof.

Illustrative Embodiment 40. The system of Illustrative Embodiment 39, wherein at least a portion of the foamed conductive hydrogel is disposed in or associated with the at least one modification.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:
1. An assembly, comprising:
at least one electrode; and
a semi-liquid hydrogel having a viscosity of between 8440 and 20000 milli pascals per second, wherein the semi-liquid hydrogel is configured to be disposed between a surface of the at least one electrode and a patient's skin.

2. The assembly of claim 1, further comprising a liner disposed on the semi-liquid hydrogel and covering at least a portion of the semi-liquid hydrogel.

3. The assembly of claim 1, wherein the semi-liquid hydrogel has a skin adhesion rate within a range of 300 g/inch to 600 g/inch.

4. The assembly of claim 1, wherein the assembly further comprises a polymerized hydrogel having a first surface and a second surface, the polymerized hydrogel being disposed between the surface of the at least one electrode and the semi-liquid hydrogel.

5. The assembly of claim 4, wherein the polymerized hydrogel is devoid of perforations.

6. The assembly of claim 4, wherein the polymerized hydrogel comprises at least one modification that extends inwardly or outwardly from the second surface.

7. The assembly of claim 6, wherein the at least one modification is one or more of:

a perforation extending inwardly from the second surface to the first surface thereof and through the polymerized hydrogel;
one or more of a first recess, a first channel, or a first well extending inwardly from the second surface of the polymerized hydrogel;
a plurality of protrusions extending outwardly from the second surface thereof, and wherein two or more protrusions form one or more of a second recess, a second channel, or a second well therebetween; and
combinations thereof.

8. The assembly of claim 7, wherein at least a portion of the semi-liquid hydrogel is disposed in or associated with the at least one modification.

9. The assembly of claim 8, wherein the polymerized hydrogel comprises a plurality of modifications that extend inwardly or outwardly from the second surface thereof, and wherein the plurality of modifications has the portion of the semi-liquid hydrogel disposed therein or associated therewith.

10. The assembly of claim 8, wherein the polymerized hydrogel comprises a plurality of modifications that extend inwardly or outwardly from the second surface thereof, and wherein at least a first portion of the plurality of modifications have the portion of the semi-liquid hydrogel disposed therein or associated therewith, while at least a second portion of the plurality of modifications are substantially devoid of the semi-liquid hydrogel.

11. The assembly of claim 1, wherein the semi-liquid hydrogel has a pH of 6.8.

12. A method, comprising:
applying two or more transducer arrays to a skin of a patient, each transducer array comprising at least one electrode; a semi-liquid hydrogel having a viscosity of between 8440 and 20000 milli pascals per second, wherein the semi-liquid hydrogel is disposed between a surface of the at least one electrode and a patient's skin; and
activating an electric field generator to supply an electrical signal to the two or more transducer arrays thereby generating an electric field for a period of time.

13. The method of claim 12, wherein activating the electric field generator further comprises activating the electric field generator to supply the electrical signal having an alternating current waveform at frequencies in a range of from 50 kHz to 1 MHz.

14. A system, comprising:
an electric field generator operable to generate an electrical signal having an alternating current waveform at a frequency in a range from 50 kHz to 1 MHz;
a first conductive lead electrically coupled to the electric field generator, the first conductive lead configured to carry the electrical signal;
a first transducer array having a first electrode element in electrical communication with a first conductive gel element; the first conductive gel element comprising at least a semi-liquid hydrogel, the semi-liquid hydrogel having a viscosity of between 8440 and 20000 milli pascals per second, wherein the semi-liquid hydrogel is configured to be disposed between a surface of the first electrode element and a patient's skin;
a second conductive lead electrically coupled to the electric field generator, the second conductive lead configured to carry the electrical signal; and
a second transducer array having a second electrode element in electrical communication with a second conductive gel element, and the second conductive gel element being configured to be in contact with a patient's skin.

15. The system of claim 14, wherein the semi-liquid hydrogel is a first semi-liquid hydrogel and wherein the second conductive gel element comprises a second semi-liquid hydrogel having the viscosity of between 8440 and 20000 milli pascals per second, wherein the second semi-liquid hydrogel is configured to be disposed between the second electrode element and the patient's skin.

16. The system of claim 14, wherein the system further comprises a polymerized hydrogel having a first surface and a second surface, the polymerized hydrogel being further disposed between the surface of the first electrode element and the semi-liquid hydrogel.

17. The system of claim 16, wherein the polymerized hydrogel is devoid of perforations.

18. The system of claim 16, wherein the polymerized hydrogel comprises at least one modification that extends inwardly or outwardly from the second surface thereof.

19. The system of claim 18, wherein the at least one modification is one or more of:
a perforation extending inwardly from the second surface to the first surface thereof and through the polymerized hydrogel;
one or more of a first recess, a first channel, or a first well extending inwardly from the second surface of the polymerized hydrogel;
a plurality of protrusions extending outwardly from the second surface thereof, and wherein two or more protrusions form one or more of a second recess, a second channel, or a second well therebetween; and
combinations thereof.

20. The system of claim 19, wherein at least a portion of the semi-liquid hydrogel is disposed in or associated with the at least one modification.

* * * * *